Patented July 14, 1942

2,289,509

UNITED STATES PATENT OFFICE 2,289,509

LUBRICANT

William M. Malisoff, Philadelphia, Pa., assignor to The Atlantic Refining Company, Philadelphia, Pa., a corporation of Pennsylvania No Drawing. Application November 1, 1933, Serial No. 696,150

11 Claims. (Cl. 252—54)

The present invention relates to the art of lubrication, and more particularly to the lubrication of surfaces engaging under extreme pressure, as for example, the rubbing surfaces of hypoid gears, free wheeling transmissions and speed reducers.

The general tendency in the design of modern machinery has been toward a higher ratio between power and "dead weight." This is especially true in the automotive industry, and in recent years certain types of gears and other mechanisms have been developed with the operating pressures on the working surfaces so high that ordinary mineral oil lubricants will not provide sufficient lubrication for satisfactory operation.

Heretofore it has been though that lubrication consists in maintaining a film of oil between the rubbing surfaces, thereby preventing them from coming into contact with one another and thus preventing wear. That this condition exists in well lubricated bearings is well known, but this conception of lubrication does not apply to highly loaded gears. In well lubricated bearings the loads rarely exceed 2000 lbs. per sq. in. projected area and the rubbing speeds are generally high enough to maintain a film of oil which separates the rubbing surfaces. In automobile gears, the pressures between gear teeth reach very high values and even the most viscous oils or greases cannot be retained between the surfaces of the teeth in a sufficiently thick film to prevent metal to metal contact, particularly when operating temperatures of 210° F. or higher are commonly encountered.

It has been known that compounded lubricants such as, for example, mineral oils containing fatty oils, fatty acids, metallic soaps or sulfur, possess lubricating qualities which render them suitable for use under high operating pressures. These compounded oils function satisfactorily under conditions which would cause failure of an unblended mineral oil, if used alone. It is believed that the successful use of such compounded oils depends upon the adsorption and reaction or union of certain components of these oils with the metal surfaces whereby a film of metallic compound, such as for example, iron sulfide is formed. It appears that such a film or plating has a low coefficient of friction and that satisfactory operation of heavily loaded bearings or gears depends upon the formation and maintenance of such a film, and not upon the retaining of a film of oil between the bearing surfaces. The hydrocarbon oil constituent of an extreme pressure lubricant serves primarily to remove frictional heat, to wash away any solid particles which may result from wear, and to prevent oxidation of the engaging surfaces.

I have discovered that the esters of the phosphorus acids and more particularly the halogenated esters of said acids, when admixed with hydrocarbon oils, are of special utility in the field of extreme pressure lubrication. The esters contemplated may contain alkyl radicals or aryl radicals, or a combination of alkyl and aryl radicals. The alkyl radicals may be represented, for example, by the radicals methyl, methylene and methine and their homologues, while the aryl radicals may be phenyl, naphthyl and anthracyl and their homologues. The akyl esters may be represented, for example, by tri-butyl phosphate, the aryl esters by tri-phenyl phosphate and the mixed esters by mono-butyl di-phenyl phosphate. I have found that halogenation of the esters may be effected under various conditions of reaction time, temperature and pressure, and in the presence or absence of a catalyst. The halogenated products may contain one or more halogen atoms to the molecule, depending upon the operating conditions and the quantity of halogen desired in the final product.

In accordance with my invention, I produce an extreme pressure lubricant which is of uniform composition, stable, non-corrosive and which will lubricate gears, bearings and similar rubbing surfaces under heavy loads in a satisfactory manner. In preparing my lubricant, I add to a suitable mineral oil an ester of a phosphorus acid in quantity sufficient to improve the lubricating value of the oil to any desired extent, depending upon the operating conditions under which the lubricant shall be used. I have found that the quantity of ester required, in general, does not exceed substantially 10% by weight of my composition. Quantities of ester as small as 3%, or even 1% or less, in certain instances, have been found to improve lubricating oils to a satisfactory extent. In preparing my lubricant, I may obtain a homogenous solution of ester in mineral oil by agitating the mixture at normal or elevated temperatures, or I may dissolve the ester in a suitable solvent and add the resulting solution to the oil, thereafter removing the solvent by vaporization.

Typical examples of my improved extreme pressure lubricant are as follows:

1. 97 parts of a Mid-Continent lubricating oil having a Saybolt universal viscosity at 210° F. of 158 seconds and an A. P. I. gravity of 22.9° was admixed with 3 parts of tri-cresyl phosphate and a homogeneous solution was obtained. Upon testing this lubricant in a Timken lubricant tester, a pressure of 33,000 lbs./sq. in. was required before scoring of the test bearing was obtained, whereas the unblended lubricating oil scored at 10,000 lbs./sq. in. pressure.

2. 90 parts of a Pennsylvania cylinder oil having a Saybolt universal viscosity at 210° F. of 203 seconds and an A. P. I. gravity of 25.4° was admixed with 10 parts of tri-butyl phosphate and a homogeneous solution was obtained. Upon testing this lubricant in a Timken lubricant tester, a pressure of 26,000 lbs./sq. in. was required before scoring of the test bearing was obtained, whereas the unblended cylinder oil scored at a pressure of 10,000 lbs./sq. in.

3. Tri-cresyl phosphate was chlorinated at a temperature of from 75° F. to 122° F. in the absence of a catalyst; the resulting product was then air blown to remove hydrochloric acid and thereafter heated to 575° F. for approximately ½ hour and then cooled. The resulting chlorinated tri-cresyl phosphate contained 3.1% of chlorine. One part of this chlorinated ester was admixed with 99 parts of a Pennsylvania lubricating oil having a Saybolt universal viscosity at 210° F. of 158 seconds and an A. P. I. gravity of 22.9°, and a homogeneous solution was obtained. Upon testing this lubricant in a Timken lubricant tester, a pressure of 30,000 lbs./sq. in. was required before scoring of the test bearing was obtained, whereas the unblended lubricating oil scored at a pressure of 10,000 lbs./sq. in.

4. Tri-cresyl phosphate was chlorinated at a temperature of from 75° F. to 140° F. in the presence of a small quantity of iodine as catalyst; the resulting product was then washed with a dilute caustic soda solution and water, and was thereafter dried by air blowing at 285° F. The resulting chlorinated ester contained 9.7% of chlorine. Ten parts of this chlorinated ester was admixed with 90 parts of a Pennsylvania cylinder oil having a Saybolt universal viscosity at 210° F. of 144 seconds and an A. P. I. gravity of 26.6° and a homogeneous solution was obtained. Upon testing this lubricant in a Timken lubricant tester, a pressure of 24,000 lbs./sq. in. was required before scoring of the test bearing was obtained, whereas the unblended lubricating oil scored at a pressure of 10,000 lbs./sq. in.

5. Tri-cresyl phosphate was chlorinated at a temperature of from 75° F. to 140° F. in the presence of a small quantity of iodine as catalyst; the resulting product was then washed with a dilute caustic soda solution and water, and was thereafter dried by air blowing. The resulting chlorinated ester contained 20.1% of chlorine. Three parts of the chlorinated ester was admixed with 97 parts of a Mid-Continent lubricating oil having a Saybolt universal viscosity at 210° F. of 158 seconds and an A. P. I. gravity of 22.9° and a homogeneous solution was obtained. Upon testing this lubricant in a Timken lubricant tester, a pressure of 23,000 lbs./sq. in. was required before scoring of the test bearing was obtained, whereas the unblended lubricating oil scored at a pressure of 10,000 lbs./sq. in.

6. Tri-butyl phosphate was chlorinated at a temperature of from 75° F. to 120° F., no catalyst being present, and the resulting product was then neutralized by filtration through brucite $(Mg(OH)_2)$. The chlorinated ester was found to contain 5.9% chlorine. Three parts of the chlorinated ester was admixed with 97 parts of a Mid-Continent lubricating oil having a Saybolt universal viscosity at 210° F. of 158 seconds and an A. P. I. gravity of 22.9° and a homogeneous solution was obtained. Upon testing this lubricant in a Timken lubricant tester, a pressure of 20,000 lbs./sq. in. was required before scoring of the test bearing was obtained, whereas the unblended lubricating oil scored at a pressure of 10,000 lbs./sq. in.

7. 97 parts of a Mid-Continent lubricating oil having a Saybolt universal viscosity at 210° F. of 158 seconds and an A. P. I. gravity of 22.9° was admixed with 3 parts of tri-phenyl phosphate and a homogeneous solution was obtained. Upon testing this lubricant in a Timken lubricant tester, a pressure of 18,000 lbs./sq. in. was required before scoring of the test bearing was obtained, whereas the unblended lubricating oil scored at 10,000 lbs./sq. in. pressure.

It will be seen, from the above examples, that the addition of an ester of a phosphorus acid to a mineral oil improves the lubricating value of such an oil to a marked extent, and imparts to the oil certain properties which render it suitable for use in the lubrication of surfaces engaging under extreme pressure.

While I have described my invention with reference to the lubrication of gears and bearings operating under heavy loads, I do not intend to limit myself thereto, but contemplate the use of my lubricant in operations such as the cutting and boring of metals, in which conditions of extreme pressure and temperature are normally encountered, and also in the lubrication of mechanisms operating under moderate pressures, as for example, the crankcase bearings and cylinder walls of internal combustion engines. Furthermore, my compounded oil may be utilized as a base in the preparation of thickened oils, i. e., greases by the addition thereto of soaps or other conventional thickening agents, whereby to obtain lubricants of desired viscosity. My compounded oil may also be blended with fatty oils, or the esters alone may be admixed with fatty oils, for the lubrication of mechanisms in which the presence of a fatty oil is desirable.

For brevity, in the appended claims, the term "viscous hydrocarbon oil" is to be understood to mean a hydrocarbon oil whose viscosity is at least as great as 50 seconds Saybolt universal at 100° F.

What I claim is:

1. A lubricant comprising a viscous hydrocarbon oil and a halogenated ester of a phosphorus acid.

2. A lubricant comprising a viscous hydrocarbon oil and less than substantially 10% of a halogenated ester of a phosphorus acid.

3. A lubricant comprising a viscous hydrocarbon oil and less than substantially 3% of a halogenated ester of a phosphorus acid.

4. A lubricant comprising a viscous hydrocarbon oil and less than substantially 1% of a halogenated ester of a phosphorus acid.

5. A lubricant comprising a viscous hydrocarbon oil containing chlorinated tri-cresyl phosphate.

6. A lubricant comprising a viscous hydrocarbon oil and less than substantially 10% of chlorinated tri-cresyl phosphate.

7. A lubricant comprising a viscous hydrocarbon oil and a halogen substituted aryl ester of a phosphorus acid.

8. A lubricating composition comprising a major proportion of petroleum lubricating oil, and a minor proportion of an aryl phosphate, the latter in an amount sufficient to increase substantially the load bearing ability and decrease the wear between relatively moving metallic surfaces when said composition is used for the lubrication thereof.

9. The method of retarding wear, scuffing or seizing of relatively moving metallic surfaces, which comprises maintaining therebetween a thin lubricating film formed by the action thereupon of an aryl phosphate, which film provides effective lubrication at pressures and speeds at which mineral lubricating oils normally will not be retained between said surfaces, said film resulting from the interposition between said surfaces, of a petroleum lubricating oil containing as a thin film forming agent, a small amount of an aryl phosphate.

10. An extreme pressure lubricant consisting of mineral lubricating oil and tricresyl phosphate in an amount sufficient to increase the load carrying capacity of the mineral lubricating oil so as to prevent seizure and scoring of bearings lubricated thereby when operated under pressures of at least 10,000 lbs. per square inch.

11. A lubricant comprising a viscous hydrocarbon oil and a small amount of a halogenated aryl phosphate.

WILLIAM M. MALISOFF.